A. H. PEYCKE.
ADJUSTABLE BRAKE HEAD MECHANISM.
APPLICATION FILED NOV. 17, 1917.
1,295,366.
Patented Feb. 25, 1919.
2 SHEETS—SHEET 1.
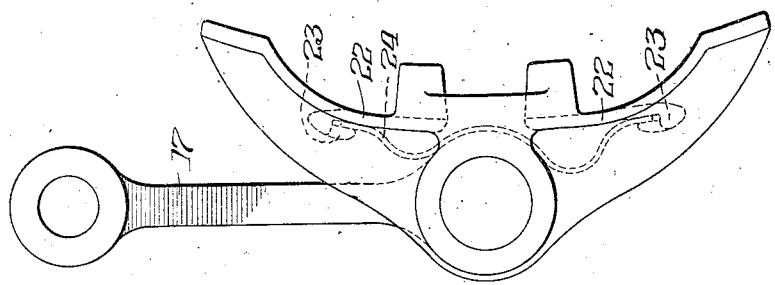
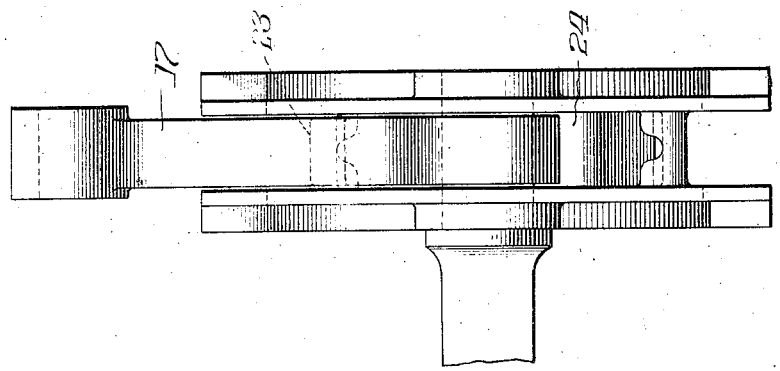
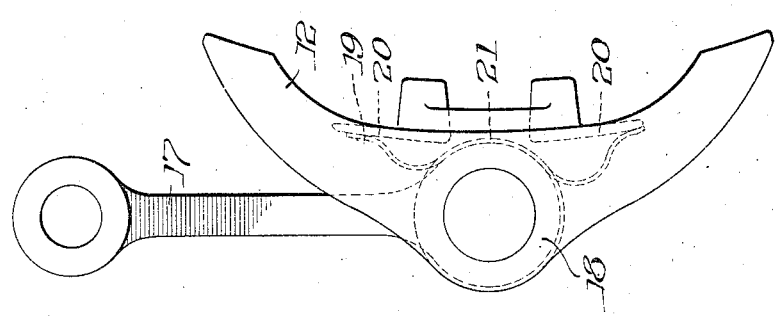
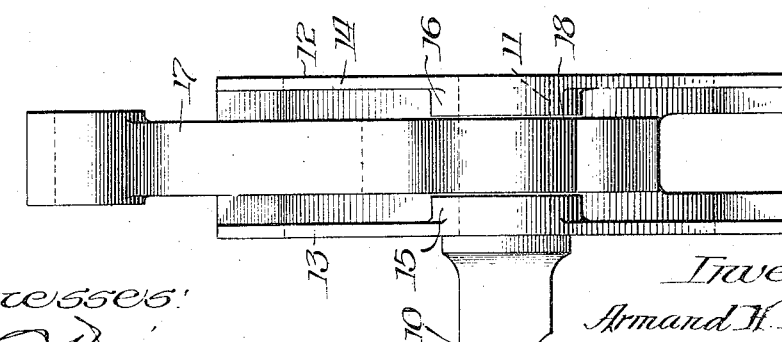
Witnesses:
Inventor:
Armand H. Peycke,
By Robinson & Huxley
Attys A. H. PEYCKE.
ADJUSTABLE BRAKE HEAD MECHANISM.
APPLICATION FILED NOV. 17, 1917.
1,295,366.
Patented Feb. 25, 1919.
2 SHEETS—SHEET 2.
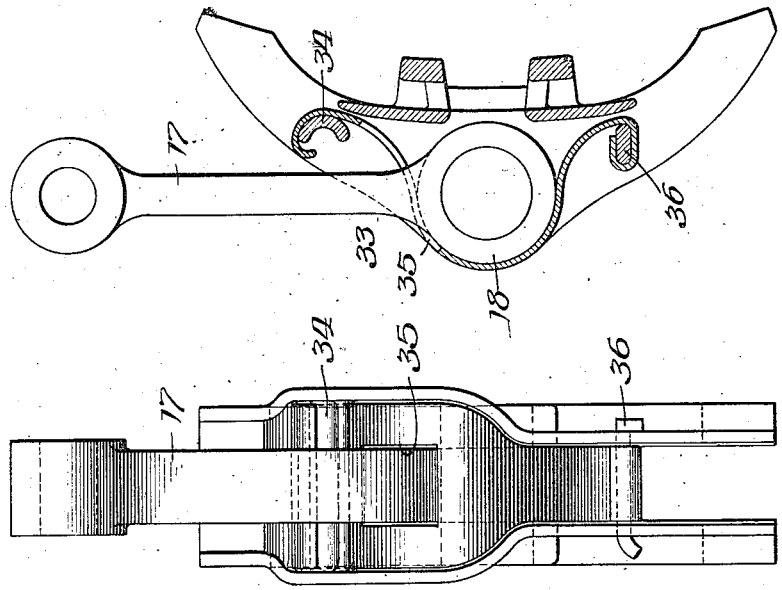
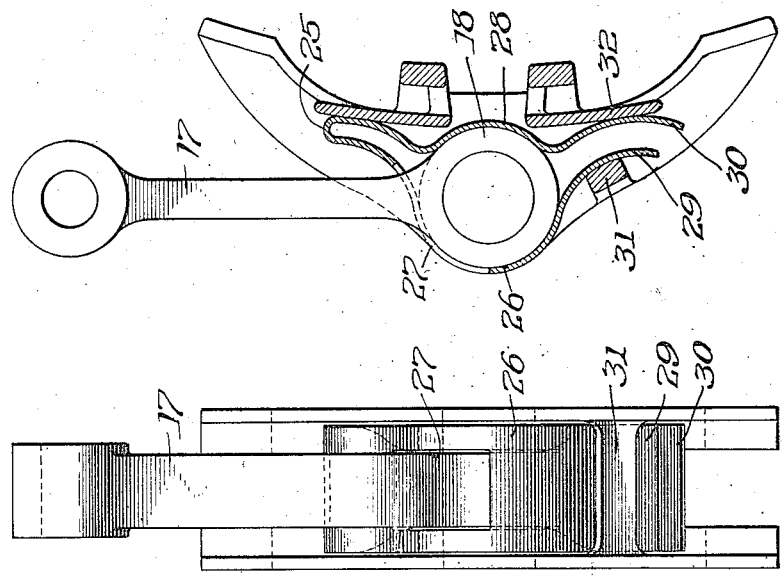
Witnesses:
Inventor
Armand H. Peycke
By Wilkinson & Huxley
Attys.

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

ADJUSTABLE BRAKE-HEAD MECHANISM.

1,295,366.  Specification of Letters Patent.  Patented Feb. 25, 1919.

Application filed November 17, 1917. Serial No. 202,497.

*To all whom it may concern:*

Be it known that I, ARMAND H. PEYCKE, a citizen of the United States, and resident of Chicago, in the county of Cook and State of Illinois, have invented certain new and useful Improvements in Adjustable Brake-Head Mechanism, of which the following is a specification.

This invention relates to brake mechanism and more particularly to a novel brake beam, brake head and hanger arrangement.

One of the objects of the invention is to improve and simplify means whereby a brake head normally may be held yieldably in any given position.

Another object is to connect brake means, heads and hangers in a novel manner making the same more durable and at the same time occupying a minimum amount of space.

Another object is to provide a novel combination of a brake beam, head and hanger adapted to meet the various requirements for successful commercial operation.

Generally speaking, these and other objects are accomplished by providing in brake mechanism, the combination of a brake head, an associated support, and means interposed therebetween for adjustably holding the brake head in a given position.

The invention is illustrated on the accompanying sheets of drawings in which,

Figures 1 and 2 are rear and side elevations, respectively, of brake mechanism embodying my invention;

Figs. 3 and 4 are rear and side elevations of a modification of my invention;

Figs. 5 and 6 are rear and side elevations of another modification of my invention, some of the parts in Fig. 6 being shown in section and, Figs. 7 and 8 are rear and side elevations of another modification of my invention, parts being shown in section in Fig. 8.

The various novel features of my invention will be apparent from the following description and drawings and will be particularly pointed out in the appended claims.

Referring first to Figs. 1 and 2 of the drawings, it will be noted that I have provided, a brake beam 10 having a trunnion 11 upon which is adjustably rotatably mounted a brake head 12 having side walls 13 and 14 with inwardly extending bearing portions 15 and 16, respectively, which receive the trunnion 11. Also pivotally mounted on the trunnion 11 is a hanger 17, the upper eye portion of which may be pivoted to any portion of the truck, the lower portion of the hanger 17 having a bearing 18 which is mounted over the trunnion 11 intermediate the bearing portions 15 and 16 of the brake head. In order at all times to maintain the braking surface of the brake shoe in concentricity with the tire of the associated wheel and also to prevent uneven wear of the brake shoe, it is necessary that the brake head be adjustably mounted on a suitable support for a movement on or about that support. At the same time normally the break head must not be permitted too free a movement relative to the brake beam trunnion. Preferably the brake head should be held yieldably in adjusted position or any other position which it may assume in accordance with working conditions. To this end I have provided yieldable means which is interposed between the brake head and a suitable supporting member associated therewith.

Referring particularly to Figs. 1 and 2, it will be noted that I have provided a spring plate 19 which is interposed between the front wall portions 20 of the brake head and the hanger trunnion bearing 18, the intermediate portion 21 of the spring plate being curved and in concentricity with the outer surface of the hanger trunnion bearing 18. In this particular instance the spring plate 19 is held in position simply by the pressure of the hanger, there being no fastening means between the brake head and the spring. By means of this arrangement the brake head normally is yieldably held in proper position and at the same time is permitted automatically to adjust itself in accordance with operating conditions.

In Figs. 3 and 4 the arrangement is substantially the same as shown in Figs. 1 and 2, with the exception, however, that the front wall portions 22 are provided with integrally formed lips 23 for the reception of the ends of the spring plate 24 whereby the spring plate 24 is held in the brake head even when the latter is disassociated with the hanger 17. The spring plate 24 may be sprung into place by the aid of a small rod pried against the lower lip 23. It will be noted that the ends of the spring plate 24 may have a sliding movement in the lips 23 when pressure conditions vary.

Referring to Figs. 5 and 6, it will be noted that the spring plate 25 embraces or substantially surrounds the hanger trunnion bearing 18, one portion 26 of the spring plate being provided with an aperture 27 through which the hanger 17 passes. The two intermediate portions 26 and 28 of the spring plate pass upon opposite sides of the hanger trunnion bearing 18 and at their lower ends terminate in tail portions 29 and 30 which are brought close to each other by lapping the former over a rib 31 formed integrally with the head and the tail 30 engaging the front wall portion 32 of the head. By means of this arrangement there is provided a larger frictional surface between the spring and the hanger trunnion bearing. This frictional pressure also is increased by the construction of the head, especially at the lower extremity thereof whereby the tail portions 29 and 30 of the spring plate are held.

In Figs. 7 and 8, I have shown a spring plate 33, the upper end of which fits around the circular rib 34 cast integrally with the brake head. The intermediate portion of the spring is provided with an aperture 35 for the reception of the brake hanger 17, its intermediate section looping around the rear portion of the hanger trunnion bearing 18. The lower portion of the spring plate 33 is held in place by a flat key 36 passing through the head.

In all of these arrangements the brake head is held yieldably by a spring plate engaging the brake head and a hanger trunnion bearing whereby the brake head automatically may be adjusted and yieldably retained in adjusted position in accordance with operating conditions.

It is apparent that there may be other modifications of the invention herein particularly shown and described and it is my intention to cover all such modifications which do not depart from the spirit and scope of the following claims.

I claim:

1. In brake mechanism, the combination of a brake head, a hanger, and resilient means engaging the front wall of said head and a portion of said hanger for adjustably holding the head.

2. In brake mechanism, the combination of a brake head, a brake hanger, and a spring interposed between said head and hanger and bent around a portion of the latter for frictionally holding the brake head.

3. In brake mechanism, the combination of a brake head, a hanger having a trunnion bearing, and resilient means interposed between said head and trunnion bearing for yieldably holding said head relative to said hanger.

4. In brake mechanism, the combination of a brake beam having a trunnion, a brake head mounted on said trunnion, a hanger also mounted on said trunnion, and spring means engaging said head and hanger and bent around a portion of the latter for frictionally holding the head in a given position.

5. In brake mechanism, the combination of a brake head, a hanger having a trunnion bearing interposed between the side walls of the head, and spring means engaging said head and trunnion bearing for yieldably holding the head.

6. In brake mechanism, the combination of a brake head, a supporting member, and a resilient member having a curved portion engaging said hanger for yieldably holding the brake head in a given position.

7. In brake mechanism, the combination of a brake head having lips, a hanger having a trunnion bearing, and spring means having portions thereof engaged by said lips and another portion which is curved around the hanger trunnion bearing for holding the brake head in a given position.

Signed at Chicago, Illinois, this 8th day of November, 1917.

ARMAND H. PEYCKE.

Witnesses:
CHAS. L. BYRON,
A. F. WADE.